United States Patent [19]

Teder

[11] Patent Number: 5,059,877
[45] Date of Patent: Oct. 22, 1991

[54] RAIN RESPONSIVE WINDSHIELD WIPER CONTROL

[75] Inventor: Rein S. Teder, Minneapolis, Minn.

[73] Assignee: Libbey-Owens-Ford Co., Toledo, Ohio

[21] Appl. No.: 569,207

[22] Filed: Aug. 20, 1990

Related U.S. Application Data

[63] Continuation-in-part of Ser. No. 455,941, Dec. 22, 1989, abandoned.

[51] Int. Cl.$^5$ .............................................. B60S 1/08
[52] U.S. Cl. ................................... 318/444; 318/480; 318/483; 318/DIG. 2; 15/250 C
[58] Field of Search ............... 318/443, 444, 480, 483, 318/DIG. 2; 15/250 C, 250.12, 250.16, 250.17

[56] References Cited

U.S. PATENT DOCUMENTS

| | | | |
|---|---|---|---|
| 3,794,847 | 2/1974 | Cadiou | 200/61.05 |
| 4,355,271 | 10/1982 | Noack . | |
| 4,481,450 | 11/1984 | Watanabe et al. . | |
| 4,595,866 | 6/1986 | Fukatsu et al. . | |
| 4,620,141 | 10/1986 | McCumber et al. . | |
| 4,636,698 | 1/1987 | LeClercq . | |
| 4,676,638 | 6/1987 | Yasuda . | |
| 4,859,867 | 8/1989 | Larson et al. | 307/10.1 |
| 4,867,561 | 9/1989 | Fujii et al. . | |
| 4,956,591 | 9/1990 | Schierbeek et al. | 318/483 |

FOREIGN PATENT DOCUMENTS

| | | |
|---|---|---|
| 2101319 | 7/1972 | Fed. Rep. of Germany . |
| 3538553 | 5/1987 | Fed. Rep. of Germany .... 15/250 C |
| 58-156439 | 9/1983 | Japan .................................. 318/443 |

Primary Examiner—Bentsu Ro
Attorney, Agent, or Firm—Haugen and Nikolai

[57] ABSTRACT

A control circuit for a windshield wiper motor is disclosed in which the wiper motor is made automatically responsive to the presence of moisture droplets on the windshield causing the wiper blades to sweep back and forth at a rate dependent upon the level of precipitation encountered. By using a set of sample-and-hold circuits, bandpass filtering and a differential amplifier under microprocessor control, disturbances to the system due to changes in ambient light are linearly rejected and the system becomes immune to such disturbances. The system utilizes an intentional-retrigger algorithm enabling the system to detect water droplets that miss the sensor yet fall within the area of the windshield which is swept by the wiper blades. The system automatically adapts to windshields of differing transmittance and is not falsely set into action by electromagnetic disturbances.

15 Claims, 9 Drawing Sheets

RAIN RESPONSIVE WINDSHIELD WIPER CONTROL

CROSS-REFERENCE TO RELATED APPLICATION

This application is a continuation-in-part of application Ser. No. 07/455,941, filed Dec. 22, 1989 (now abandoned).

BACKGROUND OF THE INVENTION

I. Field of the Invention.

This invention relates generally to a control circuit for use with the windshield wiper motor on a vehicle, and more particularly to a circuit which senses the presence of moisture droplets on the windshield to activate the wiper motor and adjust its speed in relation to the intensity of the precipitation encountered.

II. Discussion of the Prior Art

Most of today's motor vehicles embodying windshield wipers utilize a wiper system in which the wiper motor is controlled to operate intermittently or at slow or fast rates depending upon the setting of a manual switch lever by the driver. Such wiper control systems also now often include a variable delay feature, whereby the time period between successive strokes, when operating in the intermittent mode, can be adjusted.

In our earlier U.S. Pat. No. 4,620,141, there is disclosed an electronic control circuit for a windshield wiper motor which includes a windshield mounted sensor module incorporating a plurality of radiant energy sources, such as LEDs, which are pulsed on and off in accordance with a pre-established duty cycle and a further plurality of radiant energy sensors, e.g., phototransistors, which are oriented relative to light transmitting channels such that they intersect at the outside surface of the windshield. The plural sensors are connected in a bridge configuration, and when water droplets impinge on the windshield, the light from the sources is refracted to unbalance the bridge. A synchronous demodulator circuit receives the output from the bridge and the switching of the synchronous demodulator is in phase with the pulsed energization of the radiant energy sources in the sensor module.

The output from the synchronous demodulator is then presented to an AGC amplifier configured to compare that signal to a predetermined reference. When the sensor bridge becomes unbalanced due to moisture on the windshield, the signal is applied to a window comparator which produces a binary signal irrespective of the direction of change. The binary signal is then integrated and applied to a voltage-controlled oscillator that is operatively coupled in circuit with the windshield wiper relay circuits to drive the wipers at a rate which varies as a function of the level of perception being encountered.

While the apparatus of our earlier patent was fully operative to control the wiping speed in accordance with precipitation levels, it was found to suffer from the drawback that sudden or pulsatile changes in ambient light striking the sensor module would frequently cause false triggering and activation of the wipers even when it was not raining. For example, when driving down a highway with shadows of telephone poles or the like sweeping across the windshield, the circuit in our earlier patent would occasionally be "fooled", resulting in false-triggering of the wiper motor. To be commercially practical, all optical rain-sensing wiper controls must be capable of dealing with the noise caused by shifts in ambient light. With prior art rain-responsive wipers, the ambient light problem has been a difficult one to deal with in that the sensing circuitry employed has been unable to distinguish between the infrared energy modulation caused by rain impinging on the windshield and changing infrared energy coming from the sun being modulated by shadows from bridges, telephone poles and the like when the vehicle is driving down the highway. In the aforereferenced McCumber patent, an attempt was made to reject ambient disturbances by canceling out common-mode noise. That system also incorporated filtering to further reduce the effects of ambient light on the rain sensor. The systems described in the prior art patents Larson et al. U.S. Pat. No. 4,859,867 and Fujii et al. U.S. Pat. No. 4,867,561, each of which relates to a rain-responsive windshield wiper control, attempt to make the control immune to ambient light by using a separate optical light sensor and then using its output to shift the threshold level at which a rain present determination is made. That is to say, a separate optical rain sensor and a separate optical light sensor are used to feed their respective outputs into a digital comparator. Each of these approaches, however, suffers from the problem that small amounts of rain cannot be detected in the presence of large amounts of light. The digital comparison merely indicates that there is more rain than light. It is important to a commercially viable rain responsive windshield wiper control that it respond to light rains as well as down-pours, even in bright sunlight.

The systems described in the aforereferenced Larson and Fujii patents require a separate sensor for the rejection of ambient light which, of course, adds to the cost of the system. More importantly, however, the effective ambient light may not be the same on the light sensor element as it is on the rain sensor element. Thus, the approach described therein has severe limitations on how accurately it can measure the ambient light disturbances.

Another problem with prior art systems involves the operation when rain may be falling in a pattern that misses the area under view of the sensor, yet obscures the windshield. All prior art systems which utilize an active sense area that is small compared to the size of the windshield suffer from this problem, and examples may be found in the aforementioned Larson, Fujii as well as Fukatsu et al. U.S. Pat. No. 4,595,866, Gibson U.S. Pat. No. 4,463,294, Shiraishi U.S. Pat. No. 4,527,105, Watanabe et al. U.S. Pat. No. 4,481,450, Noack U.S. Pat. No. 4,355,271 and others. In the present invention, the water that missed the sensor is gathered up by the windshield wipers, passed over the sensor, and detected. This intentional retriggering algorithm thus effectively utilizes the entire swept area of the windshield to detect water, obviating this problem.

A further shortcoming of the prior art systems based upon optical technology is that they will tend to lose sensitivity over the life of the vehicle, as the windshield surface becomes pitted and the optical quality of the system degrades. Further, the system will perform differently for windshields of different transmittance. Most prior art arrangements simply permit the unit's performance to degrade, as in Schierbeek et al. U.S. Pat. No. 4,916,374. The aforementioned McCumber patent teaches that one may use an automatic gain control (AGC) which will adjust the sensitivity of the system to compensate for these variations. The problem with the AGC approach is that as the system increases its gain to achieve proper sensitivity, the device will amplify ambient light disturbances and other noise along with the desired signal. Thus, the signal-to-noise ratio of the system declines. The present invention teaches that one may detect the strength of the signal coming back to the photodetectors and appropriately change the intensity of the photoemitters, allowing the system to function as a constant signal-to-noise ratio device.

OBJECTS

It is the principal object of the invention to provide a control system for an electric motor-driven device which will cause the device to operate in response to rain impinging on a transparent surface.

Another object of the present invention to provide an improved, more reliable, windshield wiper moisture responsive control system.

Yet another object of the invention is to provide a control system for a windshield wiper motor which will respond solely to moisture droplets impinging o the windshield and which is immune from changes in ambient light impinging on the windshield.

Still another object of the invention is to provide a moisture-sensitive windshield wiper control capable of maintaining sensitivity to rain even in the presence of high ambient light disturbances.

Another object of the invention is to provide a windshield wiper control system which is intentionally retriggered to clear a windshield where the view is obstructed but where rain has not impinged on the windshield surface subtended by the optical sensor element.

A further object of the invention is to provide in an automatic rain-responsive motor control system an optical sensor that is self-calibrating, allowing use on equipment having varying optical transmissitivity characteristics.

SUMMARY OF THE INVENTION

The foregoing features and objects of the invention are achieved by dividing the duty cycle of the pulsatile energization of the radiant energy sources into a rain-sensing interval when the sources are on, and an ambient light sensing interval when the radiant energy sources are off. The plural photosensors comprising the sensor module are connected as parallel series-pairs between a positive voltage rail and a ground rail, and the common point of each pair is tied in common to first and second sample & hold circuits. The first sample & hold circuit captures the voltage output of the sensor circuit during the rain sense interval and the second sample & hold circuit captures the sensor output voltage during the ambient light sense interval. The sampled signals are then applied to a time-shifted differential summing circuit which effectively serves to remove the common-mode sensor voltage changes due to shifts in ambient light.

In accordance with a first embodiment, the output from the differential summing circuit is amplified and bandpass filtered and applied to a first input of a window comparator. So long as the input to the comparator lies between two pre-established thresholds, the indication is that no rain has been sensed. Should the amplified and bandpass filtered signal excursion occurring during the rain-sense interval exceed the window limits, either upwards or downwards, a binary-type pulse signal is delivered to a microprocessor which is programmed to function as a rain-controlled oscillator. The microcontroller delivers the requisite control signals to an electric motor controlled device, such as a vehicle's windshield wiper motor to cause intermittent, slow or fast wiping strokes, depending upon the rate at which rain droplets are sensed during the rain sense sampling intervals.

A further sample & hold circuit is provided for capturing the voltage at the positive voltage rail during the light sense interval. That captured signal is also amplified and bandpass filtered before being applied to a further window comparator. Should a change in ambient light cause the voltage on the positive rail to change sufficiently so that its amplified version falls outside of the limits established at the window comparator, a binary pulse-type signal is produced and applied as an input to the microcontroller. This input is effective to blank out any change in the frequency of the rain-controlled oscillator for a short predetermined time interval, thus, further inhibiting the system from false-triggering due to shifts in ambient light due to shadow artifacts and the like.

In accordance with the present invention, then, the very same sensor used to detect rain is also used to linearly cancel the effects of changes in ambient light. The electronics are configured to sample the output of the rain sensor at two different intervals in time and to determine the difference between the two samples. The two samples in question are the effect of light only on the sensor and the effect of light plus rain on the same sensor. The electronics permit the linear removal of the effects of light such that the resulting signal represents only the effect of rain on the sensor.

This concept constitutes a significant improvement over the prior art in that it can detect small amounts of rain even in the presence of high intensity ambient light.

Because of the unique approach embodied in the present invention, it is capable of reacting to spray from a vehicle ahead such that the rain sensing system functions even on sunny days. This would not be true of either the aforereferenced Larson or Fujii systems.

The circuitry of the present invention also provides for automatic LED current adjustment to compensate for changes in transmittance of different windshields. Rather than using an automatic gain control approach where an adjustment is made to the gain of the downstream demodulation amplifier, in accordance with the present invention, the intensity of the LED excitation source is adjusted to accommodate differences in the transmittance of the windshield.

DESCRIPTION OF THE DRAWINGS

The above-described features, objects and advantages of the invention will become apparent to those skilled in the art from the following detailed description of the preferred embodiment, especially when considered in conjunction with the accompanying drawings in which.

DESCRIPTION OF THE PREFERRED EMBODIMENT

Figure 1:
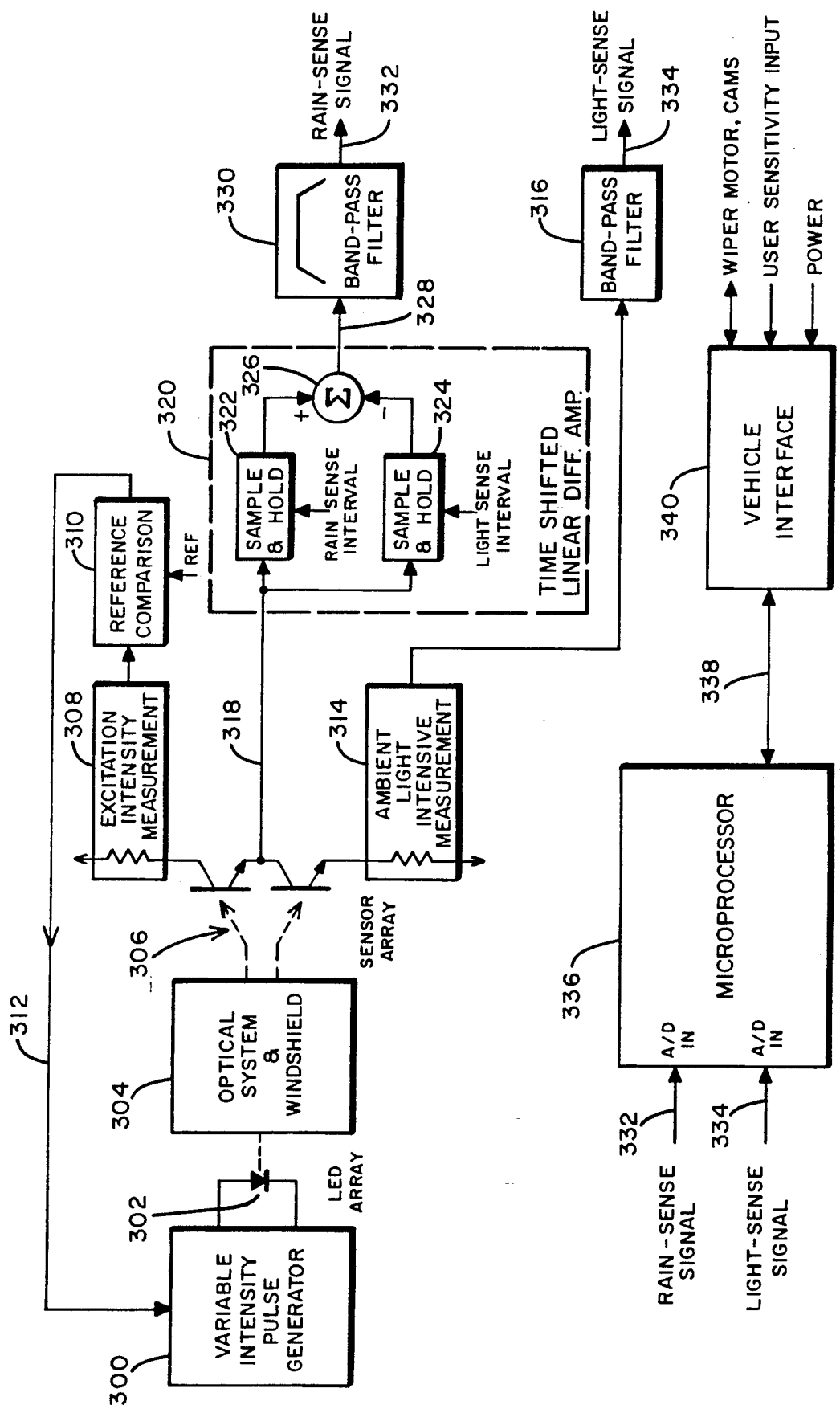
FIG. 1 is a block diagram of the rain responsive windshield wiper control system of the present invention.

Referring first to FIG. 1, there is shown a system block diagram of the improved rain responsive windshield wiper control of the present invention. While the system is described in connection with controlling the operation of a motor vehicle's windshield wipers, those skilled in the art will appreciate that the same concepts may be applied to operating other mechanisms on an automobile, such as its windows, a convertible top or a sun roof panel in the event of the onset of precipitation.

The control system is seen to include a variable intensity pulse generator 300, which is adapted to drive an array of light-emitting diodes, only one of which is shown and which is identified by numeral 302. The number of LEDs employed depends upon the area of the windshield to be occupied by the sensor module in which the LEDs are mounted. The light energy emitted by the light emitting diode when driven by the pulse generator 30 passes through an optical channel including optical fibers disposed in a windshield-mounted sensor block as well as through the glass of the windshield as represented by block 304. The sensor module also includes an array of photo-transistors, here identified generally by numeral 306. Each LED illuminates two phototransistors so that there are twice as many photosensors as LEDs. Means coupled to the photo-transistors 306 are operative to measure the excitation intensity (block 308) and provide a signal to a comparator 310, which compares the measured excitation intensity with a predetermined reference and provides a feedback difference signal over line 312 to the variable intensity pulse generator 300 driving the LEDs. Also coupled to the photo-sensors 306 is an ambient light intensity measurement circuit 314 which provides an output to a bandpass filter 316.

At this point it is important to note that the duty cycle of the pulses emanated by the generator 300 provide for a rain sense interval when the LED array 302 is being energized and an ambient light sense interval when the LED array 302 is not being pulsed. The signal output from the sensor array is fed over line 318 to what may be termed a time-shifted linear differential amplifier 320. That is, the linear differential amplifier 320 is a means for linearly rejecting disturbances that are common in time to two closely spaced time samples of the sensor output signal. The amplifier includes a rain sense sample-and-hold circuit 322 and a light sense sample-and-hold circuit 324. A signal proportional to the output of the sensor array 306 during the light sense interval is effectively subtracted in the differential summing amplifier 326 from a signal proportional to the output from the sensor array during the rain sense interval when the LEDs 302 are being driven. The resulting output on line 328 is then band-pass filtered at 330 with the resulting output on line 332 comprising the "rain-sense" signal. Likewise, the output from the bandpass filter 316 on line 334 comprises the light sense signal. In accordance with a first embodiment, the analog output from the differential summing amplifier 326 are first bandpass filtered and signal processed in window comparators to develop digital signals before being delivered to a microprocessor 336. Where the microprocessor has on-board A/D converters, the analog version of the rain-sense signal and light-sense signal ar sent over lines 332 and 334 and are digitized for subsequent use as operands which can then be manipulated by the microprocessor 336 to provide control signals on lines 338 to the vehicle interface circuitry 340 used to match the system of the present invention with a variety of different motor-operated devices, e.g., the windshield wiper systems used by the several automotive manufacturers.

It can be seen that the system represented by the block diagram of FIG. 1 allows one to use the same sensor that detects the presence of rain on the vehicle's windshield to linearly cancel the effects of ambient light variations. That is to say, the system described herein samples the output of the sensor 306 at two different points in time and determines the difference between those two samples. The first sample reflects the effect of light only on the sensor while the second sample reflects the effect of both light and rain on that sensor. By linearly subtracting the ambient light signal from the signal due to light plus rain, only the effect of rain on the sensor results.

Those skilled in the art will appreciate that a variation can exist in the transmittance of light energy through different windshields. For example, different types of glass exhibit differing amounts of IR radiation absorption. One glass, sold under the trademark EZ KOOL TM by Libbey-Owens-Ford Co. (LOF) is found to reduce the heat rise in the interior of a motor vehicle due to incident radiation from the sun. Other manufacturers may include coatings or darkening agents for related purposes. To make the system of the present invention more universally applicable to a wide variety of motor vehicles, the system of the present invention is designed t provide for the automatic changing of the intensity of the excitation delivered to the LED diode array 302 rather than utilizing a more conventional AGC approach for varying the gain of an AGC amplifier disposed downstream from the photosensor. Because the excitation intensity measurement circuit 308 operates independent from the balanced output of the sensor, a meaningful representation of the excitation signal strength can be produced even when the actual sensor output is zero. That signal is fed back to the variable intensity pulse generator 300 to vary the amplitude of the drive signal applied to the LED array 302. As will be explained more fully hereinbelow when the specific implementation of the system of FIG. 1 is set forth, predictable behavior even with a wide variation in windshield transmittance and other optical phenomena can be achieved. Not shown in FIG. 1 are connectors from the microprocessor to provide appropriate timing for LED pulse generation and sample-and-holds.

Figure 4:
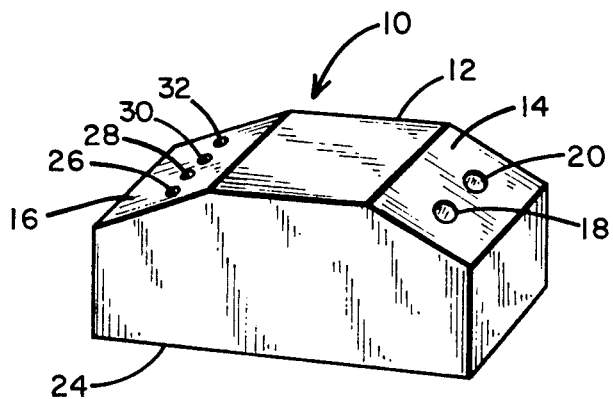
FIG. 4 is a perspective view of the windshield-mounted sensor module.
Figure 5:
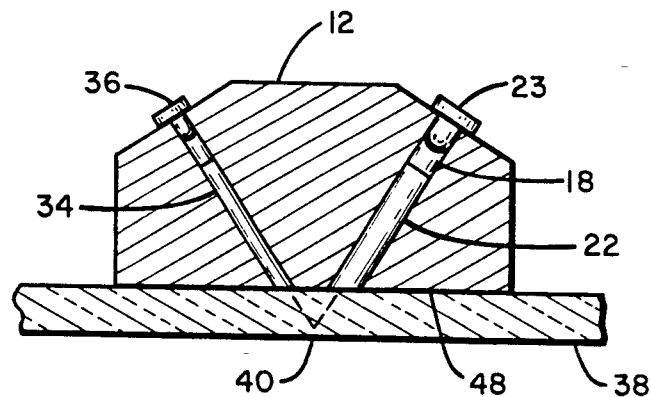
FIG. 5 is a cross-sectional view of FIG. 4.

Referring momentarily to FIGS. 4 and 5, the mechanical construction of the rain sensor unit will now be explained. The unit is indicated generally by numeral 10 and is seen to comprise a block 12 of opaque material having chamfered surfaces 14 and 16 which form an angle of approximately 45° with the horizontal. Drilled or otherwise formed in the chamfered surface 14 and extending at an angle of approximately 45° with respect to the base of the block 12 are a pair of bores 18 and 20. For purposes of illustration only, and without intending any limitation, the bores 18 and 20 may be about 7/32nds of an inch in diameter which allow a 3/16th inch Lucite rod or a light pipe 22 to be placed into the bore, the lower end of the light pipe being shaped to be coplanar with the base 24 of the opaque block 12. Also fitted in each of the bores 18 and 20 is a light-emitting diode (LED) preferably emitting radiation in the infrared spectrum.

In a similar fashion, there is formed in the chamfered surface 16 of the block 12 a plurality of cylindrical bores 26, 28, 30 and 32. While only four such boxes are depicted, in practice more may be added to cover a greater area, say 12 cm$^2$. These bores also extend at an angle of approximately 45° to the horizontal and intersect with the base 24 at a point which is spaced approximately 0.47 inches from the point of intersection of the bores 18 and 20 with the base 24.

The bores 26-32 may be 5/32nd of an inch in diameter so as to receive 1/8th diameter acrylic or other clear plastic rods, such as 34 in FIG. 5. Alternatively, a fiber-optic bundle may be employed. Fitted into the upper end of the bores 26-32 and communicating with the acrylic light pipes 34 are a corresponding plurality of photo-transistors, only one of which is shown in FIG. 5 and which is identified by numeral 36.

The block 12 is arranged to be adhesively bonded to the inside surface of the vehicle's windshield 38. When it is considered that windshield glass is generally 0.230 inches in thickness and given the angle at which the respective bores 18-20 and 26-32 make with the windshield surface 38, the point of intersection of light passing through the light pipes 22 with the imaginary axis of the sensor bores 26-32 is at the exterior surface 40 of the glass sheet 38. Thus, the geometry is such that, taking into account the change in the index of refraction between glass and air at the surface 40, light from the LEDs 23 will be reflected up through the light pipes 34 and onto the associated photo-transistor sensors 36 contained within the bores 26-32. The presence of water droplets on the outer surface 40 at the point of intersection of the light from the LEDs 23 will alter the angle and position of the reflected light and will cause the light to be scattered so that it no longer uniformly passes through the light pipes 34 associated with the photo-transistor sensors 36. As will be explained in greater detail later, it is this change in light intensity reaching the sensors that ultimately triggers the motor of the device being controlled, e.g., windshield wipers, into action.

Figure 6:
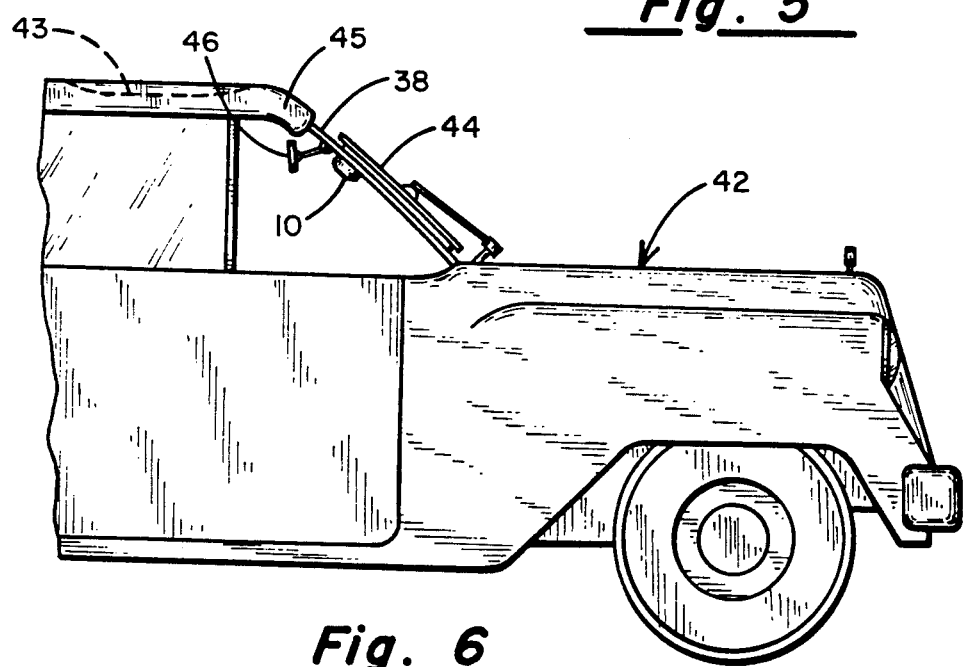
FIG. 6 illustrates the manner in which the sensor unit of FIG. 4 may be mounted on a windshield.

Referring now to FIG. 6, there is shown a motor vehicle 42 having a having a motor-operated sun roof panel 43 or a motor-operated convertible top and a motor-operated windshield wiper on its windshield 38. While the invention is being described in connection with controlling the operation of a windshield wiper 44, those skilled in the art will recognize that the invention may also be applied to controlling the motor-operated windows, top and/or sun roof panel just as well. The windshield wiper 44 is of a conventional design which is driven by a wiper motor (not shown) to cause the blade 44 to oscillate back and forth across the windshield surface to remove rain or the like therefrom. Tucked up behind the rear-view mirror 46 in the passenger compartment is the sensor housing 10. Being behind the rear-view mirror 36, the unit 10 does not interfere with the field of view of the driver or passenger. As is more fully explained in connection with the discussion of FIG. 7, the unit 10 is positioned in the path swept by the wiper blade 44.

Incidentally, in those installations where the windshield glass thickness is found to be less than 0.230 inches, it is contemplated than an acrylic or other clear plastic shim 48 of a suitable thickness may be inserted between the base 24 of the housing 12 and the interior surface of the windshield so as to increase the effective thickness of the glass to the desired 0.230 inches.

Having described the mechanical configuration of the sensor unit 10, consideration will next be given to the electronic circuit which is used to monitor the condition of the IR light reaching the photo-sensors. In this regard, reference is made to the circuitry of FIGS. 2a and 2b, which when arranged as in FIG. 2 illustrate a first preferred embodiment.

Figures 2, 2A:
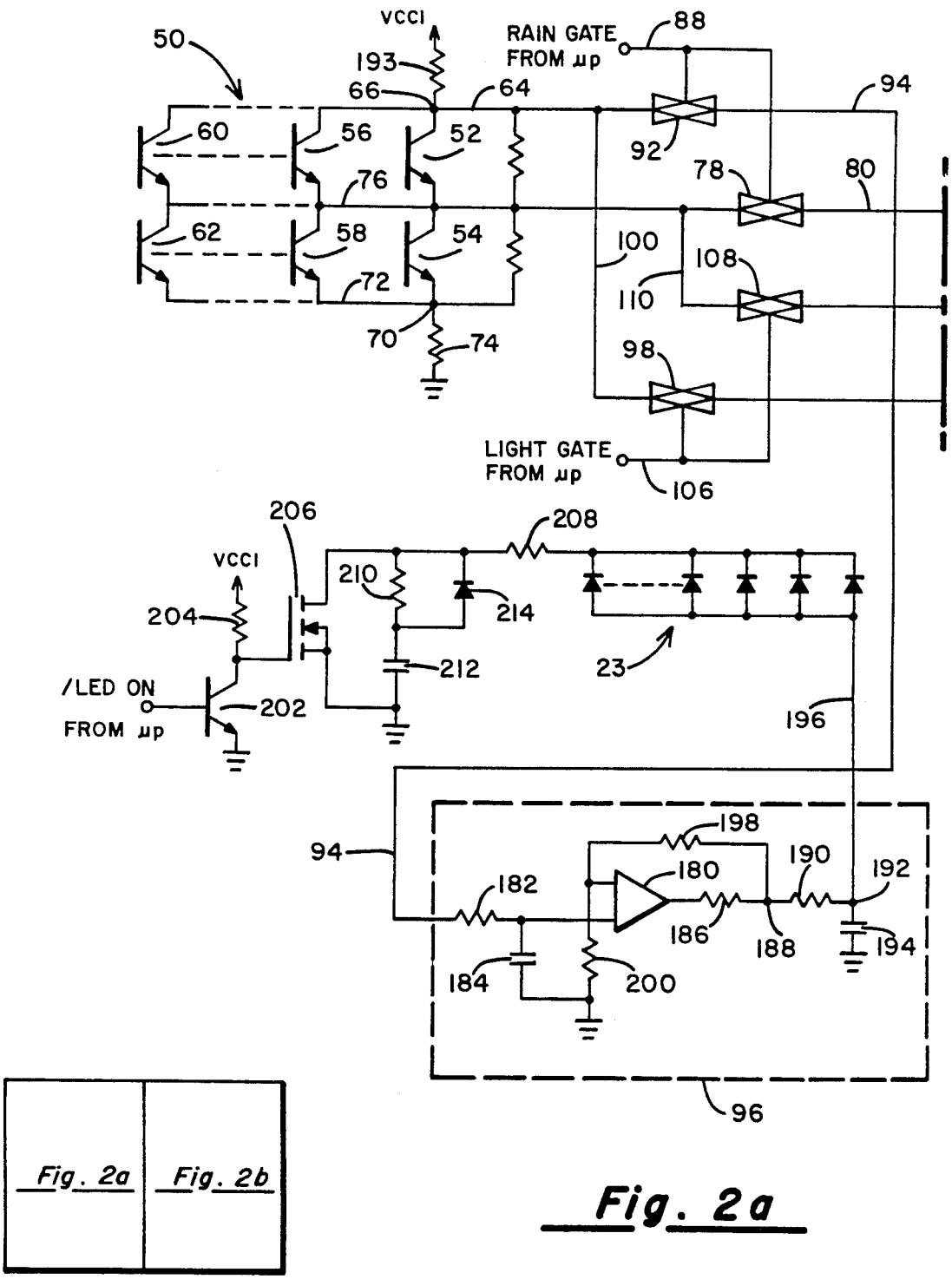
FIG. 2 shows arrangement of FIGS. 2a and FIG. 2b.
FIGS. 2a and 2b, when arranged as shown in FIG. 2 is a schematic electrical diagram of a first embodiment of the invention.

The photo-sensors contained within the bores in the block 12 are identified generally in FIG. 2a by numeral 50 and are arranged in parallel groups of series-connected pairs as at 52-54, 56-58 . . . 60-62. The collectors of the upper row of photo-transistors are connected in common by a conductor 64 to a junction 66 which, in turn, is coupled to a potential source $V_{cc1}$, via a resistor 193. Likewise, the emitter electrodes of the lower row of photo-transistors are connected in common at a junction 70 by a conductor 72 and the junction 70 is coupled, via a resistor 74, to a source of reference potential (ground). Resistors 193 and 74 are of equal ohmic value such that when the entire array of photo-transistors is uniformly illuminated, the potential on sensor output conductor 76 lies approximately halfway between the source $V_{cc1}$ and ground. Conductor 76 is seen to connect all of the junction points of the series connected pairs in common to the input of a first element 78 of a quad-bilateral switch whose output is tied, via a conductor 80, to a junction 82 between a capacitor 84 and a large value resistor 86. The on/off state of the quad-bilateral switch element 78 is controlled by a digital pulse signal applied to the terminal 88 from a microcontroller 90. This same control signal is applied to a second element 92 of a quad-bilateral switch whose input is tied to the junction 66. The output from the switch 92 is connected, via a conductor 94, to the input of an automatic intensity control circuit, shown enclosed by broken line box 96. The intensity control circuit works to automatically adjust the current flow through the photo-emitters, indicated generally by numeral 23, to accommodate differences in transmissivity of windshields from vehicle-to-vehicle. The manner in which this is carried out will be explained in greater detail below.

A third element 98 of the quad-bilateral switch receives its input from the junction 66, via a conductor 100, and it provides an output at junction 102 when the switch element 98 is on. Junction 102 has a capacitor 104 tied between it and ground. The on/off control for element 98 also comes from the microcontroller 90, Via conductor 106. Conductor 106 also is connected as a control input to the fourth element 108 of the quad-bilateral switch, and the input to switch element 108 comes from the photo-sensor array 50, via conductors 76 and 110. The output of switch 108 is applied to a junction 112, and a capacitor 114 is connected between that junction and ground.

Switch elements 78, 108 and 98 along with their respective capacitors 84, 114 and 104 comprise sample & hold circuits. That is to say, when the switch elements are turned on, the voltage appearing at their input is stored momentarily in the respective capacitors.

The voltage held on capacitor 84 is applied, via resistor 86 and a conductor 116, to the inverting input of a differential summing circuit 118. Likewise, the voltage held on capacitor 114 is applied to the non-inverting input of the amplifier 118 by way of a resistor 120. The feedback elements 122 and 124 cause the operational amplifier 118 to function as a differential summing network whereby the output appearing at junction 126 is proportional to the voltage difference between the two voltage signals applied to its input junctions 82 and 112.

The output from the summing amplifier is AC-coupled, via a capacitor 128 and a resistor 130, to a bandpass filter which includes a high-gain operational amplifier 132 and the feedback network comprising resistors 134 and 136, which are connected in series between the output terminal 138 and the input terminal 140. The common junction 142 between resistors 134 and 136 is tied to ground through a series-connection of a capacitor 144 and a resistor 146. The component values are selected so as to provide a passband providing about 30 dB of gain between about one-half hertz and 25 hertz. In this fashion, 60 hertz noise from power lines, fluorescent lighting and the like is rejected. Low frequency changes in ambient light, such as may result when steering a vehicle into sunlight, is rejected at the low end of the bandpass filter.

The output from the gain/bandpass filter stage appearing at junction 138 is applied to the inverting input of a first comparator 148 and to the non-inverting input of a second comparator 150. The second input of amplifier 148 is connected to the reference potential $V_{cc1}$ while the second input to amplifier 150 is connected to a fixed voltage $V_{ref}$. Those skilled in the art will appreciate that the comparators 148 and 150 are thus configured as a window comparator to produce a binary output level shift when the signal at junction 138 falls outside of the range between $V_{cc1}$ and $V_{ref}$ in either direction. This output appearing at terminal 152 becomes an input to the microcontroller 90.

The voltage held on capacitor 104 following the turning on of the switch 98 is applied to a "light sense" detection circuit shown enclosed by the broken line box 154. More particularly, the output at junction 102 is AC-coupled, via capacitor 156 and a resistor 158, to a junction point 160 at which the input to a further amplifier/bandpass filter circuit including the operational amplifier 162 and its associated feedback resistors 164 and 166 and the shunt components including resistor 168 and capacitor 170.

The lower cutoff frequency of the light sense detection circuit 154 is preferably about one-third hertz while its upper cutoff frequency is about 30 hertz. As such, the frequency range of the light sense detection is just a bit wider than that of the rain-sense detection. Therefore, the light-sense detection circuit will sense any sort of ambient light level or electromagnetic disturbances change which might have the potential of "fooling" (or triggering) the rain sense circuit.

The output appearing at junction 172 is also applied to respective inputs of a pair of comparators 174 and 176, which are configured to function as a window comparator having the same voltage thresholds as the window comparator 148–150. Again the binary pulse output signal appearing at junction 178 is applied as an input signal to the microcontroller 90.

The automatic intensity control circuit 96 includes an operational amplifier 180 whose non-inverting input is coupled to the output of a sample & hold circuit which includes the bi-quad switch element 92, resistor 182 and capacitor 184. The output from the amplifier 180 is fed through a resistor 186 to a junction 188 and thence through another resistor 190 to a junction 192. A capacitor 194 joins the junction 192 to ground and a conductor 196 connects the junction 192 to the cathodes of the light-emitting diodes 23. Also associated with the intensity control amplifier 180 are feedback resistors 198 and 200 which are connected in series between the junction 188 and ground. The common point between resistors 198 and 200 is connected to the inverting input of the amplifier 180. The intensity of the signal coming back to the phototransistors (50) is proportional to the current flowing through measurement resistor R during the rain-sense interval. Thus, a voltage is developed across resistor 193 which is proportional to the received signal. This voltage is sampled and held during the rain-sense interval by an active switch 92, resistor 182 and capacitor 184. The automatic adjustment circuit 96 accordingly adjusts the LED current so that the received signal is held at an approximately constant level. Thus, the system operates at an approximately constant signal-to-noise ratio.

The anodes of the light-emitting diode radiant energy sources 23 are connected in common to a semi-conductor switching circuit including an NPN transistor 202 whose emitter is tied to ground and whose base electrode is adapted to receive a pulse-type control signal from the microcontroller 90. The collector is tied to the reference potential source $V_{cc1}$ by way of a resistor 204 and serves to drive MOSFET switch 206 whose output is coupled through a resistor 208 to the anodes of the LEDs 23. Resistor 210, capacitor 212 and diode 214 function as a snubber. Thus, upon command from the microcontroller 90, the LEDs 23 will be turned on for a time period referred to as the "rain sense" interval. The level of illumination of the LEDs is determined by the feedback circuit 96.

In particular, the use of the intensity control circuit allows a standard manufactured unit to be mounted on a variety of windshields, i.e., windshields having differing light-transmissive properties. The brightness of the LEDs radiant energy sources thus self-adjusts.

With no limitation intended, the microcontroller 90 may comprise a Type S87C751 microprocessor manufactured by Signetics. It includes a crystal-controlled oscillator 216 providing regularly occurring clock pulses on pins 10 and 11 thereof. The connection to pin 9 provides a power-up reset feature. The LIGHT-SENSE input LS from window comparator 174/176 is applied to pin 5. Pins 1 through 4 are connected to a manually operable dip switch 218 and are used to provide inputs to the microprocessor for identifying the particular windshield wiper system with which the present invention is to be used. Considering the invention as being employed on automobiles, the dip switches 218 allow 16 different types of automobiles to be identified to the microprocessor.

Pins 13 and 14 respectively provide the light gate control to terminal 106 of the quad-bilateral switches 98 and 108. The rain gate control output is developed on pin 14 of the microcontroller and is applied to the control terminal 88 associated with the bi-quad switches 78 and 92. Pin 15 develops the LED ON signal applied to transistor 202. Pins 16, 17 and 18 of the microcontroller 90 are input terminals and receive logic inputs from the vehicle with which the system of the present invention is used. The logic inputs from the vehicle allow the driver to override the automatic wiper control and turn the wipers steadily on or off. This might be used, say, when entering an automatic car wash. Several logic lines and some interpolation on the part of the microcontroller is necessary because different types of vehicles are wired differently in the area of the wiper switch.

Pins 19, 20 and 21 provide outputs to the wiper motor relays and can be considered commands to shut off and park the wipers, operate the wipers at their fast speed and to operate the wipers at their slow speed, respectively. Pin 23 is an input point for receiving the RAIN SENSE from terminal 152 of the window comparator.

Now that the details of the construction of the control circuit have been explained, consideration will now be given to its mode of operation and, in this regard, reference will be made to the waveforms shown in FIG. 8.

OPERATION

The photosensors 52 . . . 62 are arranged in a symmetrical array in the block 12 mounted on the inside surface of the windshield and when the ambient light (as distinguished from the LED light) is uniformly distributed over the windshield, the output voltage on line 76 will be approximately halfway between $V_{cc1}$ and ground because of the equality of the resistors 68 and 74 and the matched properties of the plural photosensors employed. The microcontroller 90 periodically pulses the transistor 202, turning on the array of LEDs 23 and, in the absence of moisture on the windshield, all of the photo-transistors will be affected equally and the voltage on line 76 will drop until the LEDs 23 are again turned off at the end of the drive pulse generated at pin 15 of the microcontroller 90. The period that the LEDs 23 are "on" may be referred to as the "rain sense interval" while the period that the LEDs are off may be referred to as the "light sense interval". With no limitation intended, the "rain sense interval" may be 30 microseconds in length while the "light sense interval" may be 2 milliseconds long. The waveform labeled "sensor output" in FIG. 8 comprises the voltage on conductor 76, assuming that water droplets are impinging upon the windshield in the area occupied by the sensing block 12. When no droplets are impinging on the windshield during the rain sense interval, there would be no pulse-like excursion at that time. This is because the turning on of the LEDs 23 will affect each of the photo-detectors 52-62 substantially identically and there will be no tendency for the output voltage on line 76 to deviate from the midpoint between $V_{cc1}$ and ground. When rain droplets are present, however, light from the LEDs 23 will be scattered due t refraction and will not affect the associated photo-detectors equally. Thus, a pulse-like excursion appears on sensor output line 76 which may be either a positive-going excursion or a negative-going excursion, depending upon whether it is one or more of the photo-transistors 52, 56 . . . 60 or of phototransistors 54, 58 . . . 62, which has the light to them blocked due to refraction of the light from the radiant energy sources 23 by the moisture.

The waveform labeled "rain sense switch" illustrates the "on" and "off" states for the quad-bilateral switch 78 by the application of the rain gate pulse to terminal 88 by the microcontroller. Similarly, the waveform labeled "light sense switch" shows the on and off condition of the quad-bilateral switch element 108. It is on or conducting during the light-sense interval but not during the rain-sense interval.

Figure 8:
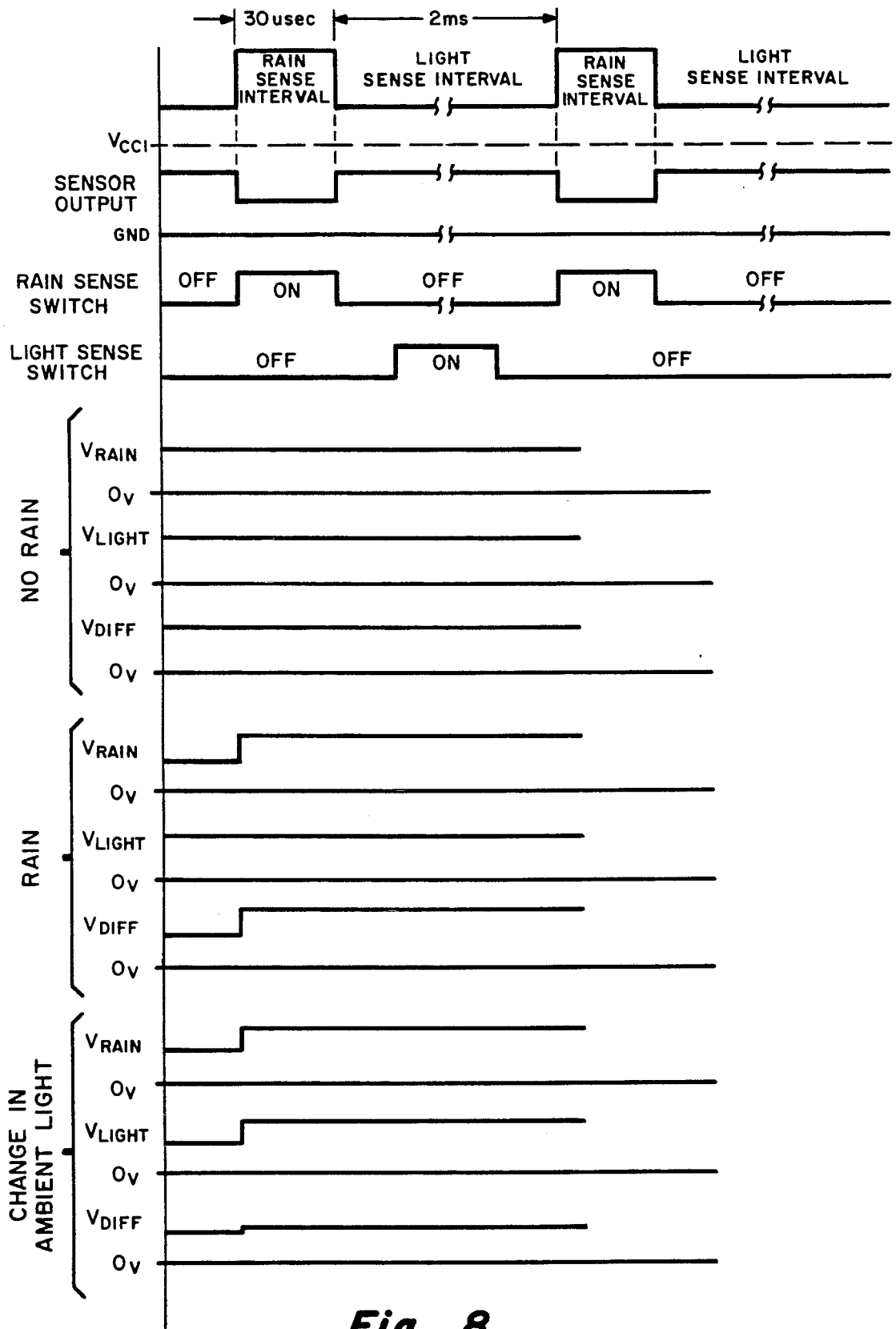
FIG. 8 illustrates a series of waveforms helpful in explaining the operation of the control circuit of FIGS. 2a and 2b.

The waveforms labeled "$V_{RAIN}$" and "$V_{LIGHT}$" in FIG. 8 represent the voltages held by the capacitors 84 and 114 as a result of the turning on of the switch elements 78 and 108. The waveform labeled "$V_{DIFF}$" represents the voltage at the output of the difference amplifier 118, i.e., at junction 126. It will be noted that when no rain is present during the rain-sense interval, $V_{DIFF}$ remains constant. However, if rain droplets are present in the area of the sensor during the rain-sense interval, $V_{RAIN}$ will exhibit an excursion due to the fact that the photosensors are not equally affected by the LED emissions. Now, when $V_{RAIN}$ and $V_{LIGHT}$ are added in the differential summer 18, the $V_{DIFF}$ will exhibit a detectable excursion. This signal is AC-coupled via capacitor 128 and resistor 130 to the high gain amplifier 132 which forms a part of a bandpass filter. If the amplified signal falls outside of the bounds established by $V_{cc1}$ and $V_{REF}$ of the comparators 148 and 150, a pulse will be applied to input pin 23 of the microcontroller 90.

Because ambient light changes affect the sensor output voltage on line 76 equally during both the rain-sense interval and the light-sense interval which are closely spaced time-wise to one another, such ambient light changes will, in effect, be nulled out by their differential summing.

The light gate signal from the microprocessor and applied to control line 106 also causes the switch 98 to turn on during the light-sense interval and the voltage appearing at junction 66 at this time is captured and held on capacitor 104. The voltage at junction 66 will shift significantly if the sensor array is subjected to a significant change in ambient light, such as maybe caused by shadows, turning into the sun, entering or exiting a tunnel, etc. Any such transition is AC-coupled to a bandpass filter/amplifier stage including the operational amplifier 162, and if the voltage shift appearing at junction 172 falls outside of the limits established by the reference voltages applied to the comparators 174 and 176, then a signal LS appearing at terminal 178 will be applied to the microcontroller 90 on pin 5.

The microcontroller is programmed to function as a rain-controlled oscillator. It drives the wiper motor relays such that the wipe rate of the blades is proportional to rain intensity. Each "rain-sense" pulse to the microprocessor causes the delay between successive wipes of the blade to be decreased. The wiping rate increases and when a certain frequency is reached, it switches into the slow mode. With still increased frequency of rain-sense events, the microcontroller will output a signal placing the wiper motor in its fast mode. If now the rain intensity drops, the microcontroller will still issue wipe commands but with a progressively longer time constant or linear decay rate than an asymptotic attack rate. If, for example, a minute passes between successive rain sense events, the wiper blades will be parked.

The occurrence of a light-sense event at junction 178 functions to blank out current rain-sense information as well as previous rain-sense events occurring during a previous predetermined time interval, e.g., 160 milliseconds. In this fashion, a large transient change in ambient light striking the windshield, if it passes through the window comparator as a LS output, will cause the microprocessor to ignore rain-sense events occurring close in time to the LS output.

ALTERNATIVE EMBODIMENT

Having described a first embodiment of the invention with the aid of FIGS. 2a and 2b, consideration will next be given to a closely related embodiment where the differences are depicted by the electrical schematic drawing of FIG. 3. For the most part, both the embodiments of FIGS. 2 and 3 comport to the general block diagram of the rain responsive windshield wiper control system illustrated in the block diagram of FIG. 1.

Figure 2B:
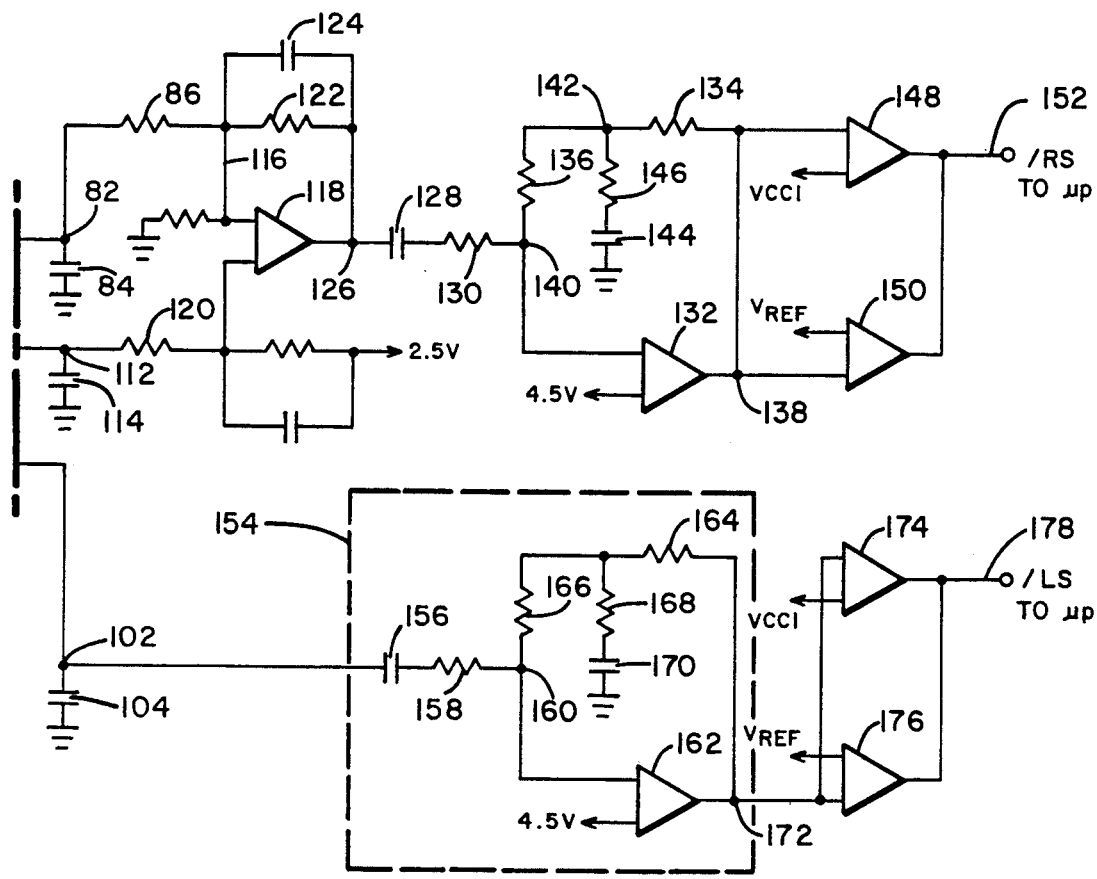
Figure 2B:
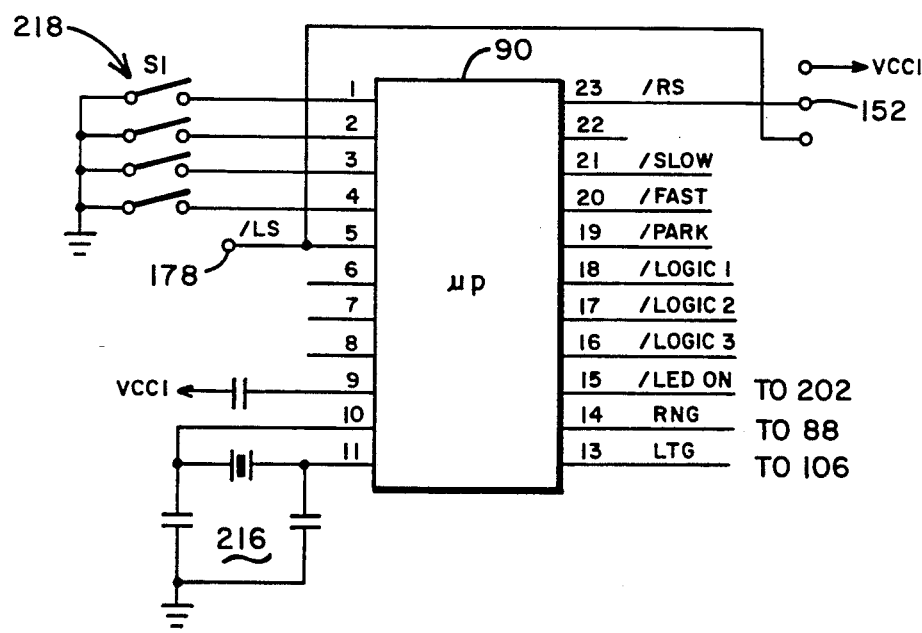
Figure 3:
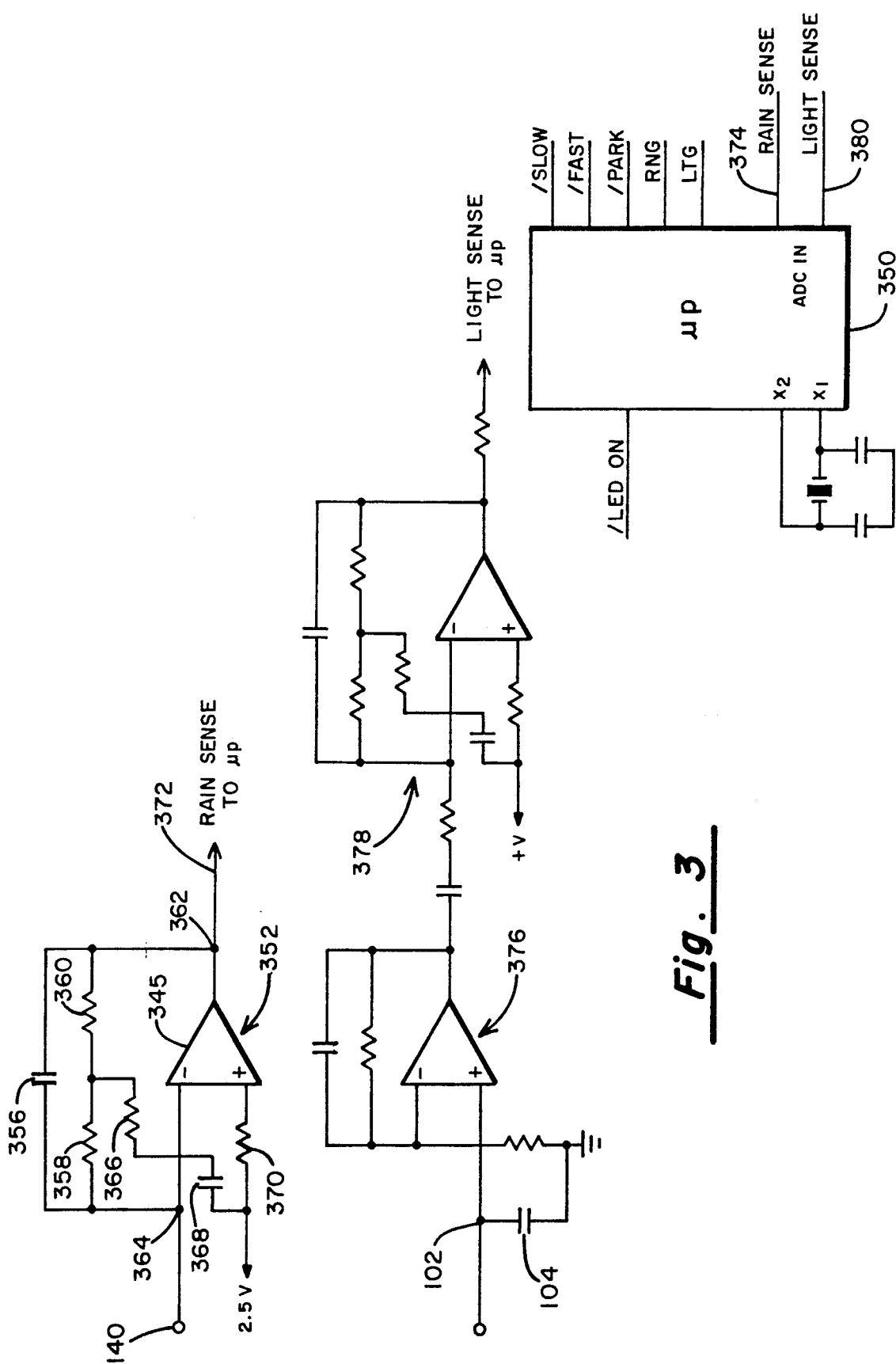
FIG. 3 shows a modification to the schematic diagram of FIGS. 2a and 2b reflecting an alternative embodiment.

In the embodiment shown in FIG. 3, a different microprocessor chip 350 is employed. Rather than utilizing a Signetics Type S87C751, a Signetics Type S87C752 may be used. It differs from the microprocessor shown in the embodiment of FIGS. 2a and 2b in that it includes an on-board ADC, thus obviating the need for the window comparators 148, 150 and 174, 176 to create digital inputs. The microprocessor 350 converts an analog rain-sense signal and an analog light-sense signal into digital form and then those operands are manipulated by the software to perform the window comparison function.

With continued reference to FIGS. 2b and 3, the circuitry to the left of junction point 140 in FIG. 2b can be replaced with a bandpass filter indicated generally by numeral 352 in FIG. 3. It includes an operational amplifier 354 having a feedback loop with a capacitor 356, a pair of series-connected resistors 358 and 360 connected in parallel with that capacitor between the op amp's output terminal 362 and its inverting input terminal 364. A shunt resistor 366 is connected between the common point of resistors 358 and 360 and through a blocking capacitor 368 to a source of DC potential. A resistor 370 also couples the DC reference voltage to the non-inverting input of the operational amplifier 354.

The component values of the feedback elements for the bandpass filter 352 just described are set to provide a pass band between a lower frequency of about 1 Hz and an upper frequency of about 20 Hz. This filter is effective to exclude any long-term shifts due to aging of components, DC level shifts, etc. The upper cutoff frequency is sufficiently low to effectively exclude 60 cycle noise, such as may be produced by fluorescent lighting. The upper cutoff also is found to effectively exclude the effects of EMI, such as produced by lightning strikes in the area. The pass band of the filter 352, however, is sufficiently broad to accommodate raindrop impacts on the windshield of the vehicle. As is indicated by the legends on the drawing of FIG. 3, the rain sense output at terminal 372 is connected to the rain sense input 374 of the microprocessor 350.

In a like fashion, the circuitry shown in the dashed-line box 154 in FIG. 2b is replaced with a high-gain amplifier stage 376 and a bandpass filter stage 378 in the alternative embodiment. The bandpass filter is substantially identical in its construction to the bandpass filter 352 except that the component values of the feedback capacitor and the parallel resistors are selected to provide a somewhat wider pass band for the filter 378. For example, component values may be selected to provide a low frequency cutoff at approximately 0.5 Hz and a upper frequency cutoff of about 60 Hz. The resulting output from the bandpass filter is the "light sense" signal which is applied to that input 380 of the microprocessor 350.

By providing the pass band as indicated, long time-constant light changes, such as may take place when the vehicle makes a turn in going from shadow into bright sunlight are suppressed. Moreover, the pass band of the filter 378 is made broader at the high end than that of the filter 352 because it is found desirable to make the light sense channel more sensitive to EMI than the rain sense channel.

Also implemented in the software of the microprocessor 350 is an algorithm which is referred to as the "intentional-retriggering" feature. To appreciate the significance of this algorithm, it is to be noted that the area of the entire windshield subtended by the sensor housing 10 may only be about 12 square centimeters. This affords the possibility that large raindrops falling infrequently may be impinging on the windshield and obstructing vision while missing the area covered by the sensor module. It is not practical to solve this problem by merely increasing the size of the sensor in that additional LEDs and photo-detectors add to the cost and complexity of the system. Rain impinging on a windshield is a highly random phenomena and the problem of failing to initiate wiper action because the sensor area is not hit can be reduced somewhat by using a smoothing algorithm, such as are taught in the Mccumber et al. U.S. Pat. No. 4,620,141 and in the Fujii et al. U.S. Pat. No. 4,867,561. Such smoothing algorithms allow one to wipe the windshield clear of droplets based upon the history of frequency of sensed rain events. By using a smoothing algorithm, the control circuitry may actuate the wiper motor, based upon history, even without actually sensing a rain event. While this helps to avoid the possibility that vision through the windshield will be obscured by rain droplets before the sensor area is struck, the long-time constant in the prior art smoothing algorithm tends to make the prior art systems respond sluggishly to changes in rain intensity.

In a situation where large raindrops are occurring infrequently, it is quite likely that the drops may obstruct vision before the sensor has actually detected a drop on the surface of the windshield which is subtends. If it is assumed that the system has been working and that the rain condition is letting up such that there are sufficient drops impinging on the windshield to obstruct view but, by chance, none has hit the area of the sensor, when using the smoothing algorithm, the wiper may be sweeping at 10-second intervals based upon prior history of sensed rain events. If in the example being considered the sensor detects no additional rain between wipes, the smoothing algorithm alone would normally decrease its estimate of the rain intensity and determine that the next interval between wipes should be longer, say, 15 seconds. If the condition persists, the interval between wipes becomes longer and longer until the smoothing algorithm determines that the wipers should be parked.

Figure 7:
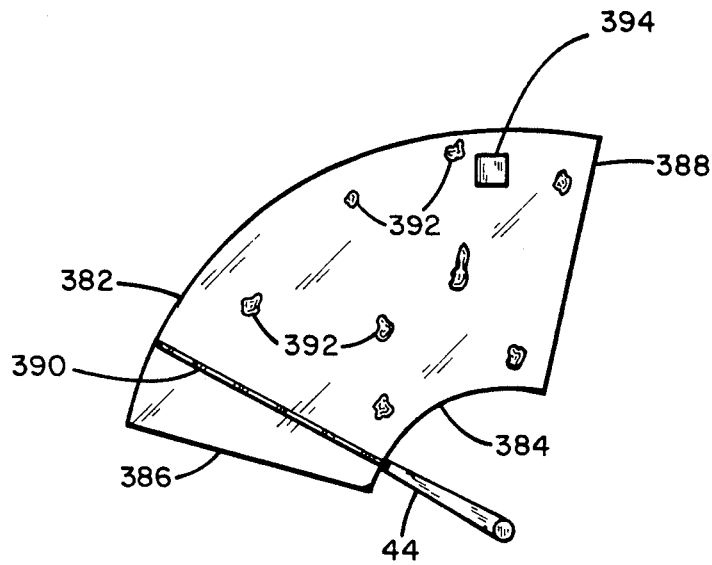
FIG. 7 is a partial front view of a windshield helpful in understanding the intentional retriggering algorithm.

The intentional retrigger algorithm of the present invention precludes this from happening. Assuming that the rain is continuing, the windshield collects water droplets between successive wipes that happen to miss this sensor but still obstruct view. During a wiper stroke, the wiper blade gathers up the water droplets in its path and pushes that water over the sensor. The circuit of the present invention detects that water as a rain event and functions to adjust the sweep rate accordingly. Thus, in the above example, after a first ten-second interval between wipes, the retriggering action of the water being pushed over the sensor causes the microprocessor to adjust the interval between wipes to be once again approximately ten seconds. The drawing of FIG. 7 illustrates the situation. The area bounded by the curved lines 382 and 384 and the straight lines 386 and 388 represent the area swept by the wiper blade 390 with the water droplets 392 being collected and swept over the area 394 occupied by the sensor housing 10.

It can be seen, then, if the amount of rain hitting the windshield is relative constant, the interval between sweeps of the wiper blade will remain approximately constant even if those drops happen to miss the sensor area altogether. Should the amount of rain decrease, the degree to which the wiper passing over the sensor retriggers the algorithm will be reduced. Thus, the algorithm would call for a longer time between sweeps. At the point that the windshield becomes dry, the intentional retrigger operation ceases and the windshield wipers will become parked. As a result, then, once the wiper control system has been set into operation, the system effectively uses the entire surface area of the windshield that is cleared by the wiper while still retaining a relatively small sensor area. This allows for smooth, yet responsive, operation of the wiper system not heretofore possible when the only active sense area on the windshield is that subtended by the sensor itself.

Figure 9:
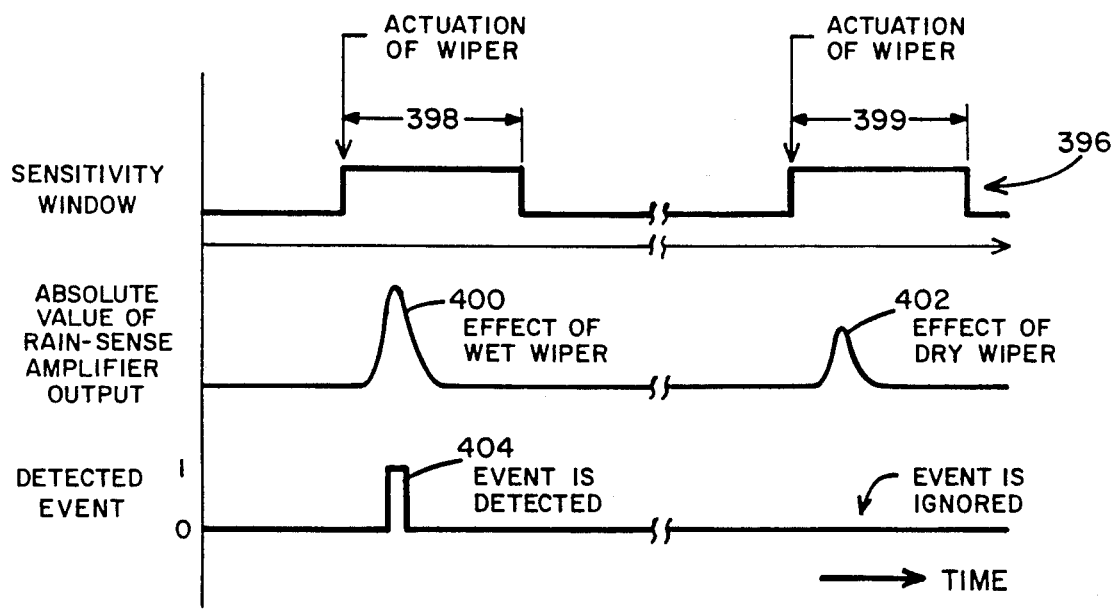
FIG. 9 shows a series of waveforms helpful in understanding the intentional retriggering concept to which FIG. 7 relates.

An important aspect of the present invention which allows the successful implementation of the intentional retriggering algorithm centers on a technique of decreasing the sensitivity of the rain-sense channel during the time interval that the wiper blade is pushing water over the sensor. Stated otherwise, the thresholds defining the window outside of which the amplified sensor signal must fall to be detected as a rain event is increased. With reference to FIG. 9, waveform 396 shows the threshold to be low except during the interval 398 when the wiper is sweeping. Waveform 400 shows the absolute value of rain-sense amplifier output when the wiper is wet while waveform 402 is typical of the signal from the rain-sense amplifier when the windshield and wiper are dry. Because of the increased sensitivity in the intervals 398 and 399, only the rain sense signal 400 exceeds the window threshold to yield a detected rain event (pulse 404). The amplitude of the output signal 402 is insufficient to exceed the increased threshold value and, as such, the event of a dry wiper passing over the sensor area is ignored.

OPTICAL MOISTURE SENSITIVE WIPER CONTROL SOFTWARE DESCRIPTION

Overall, the software for the wiper control system functions as a complex window comparator and smoothing algorithm. That is, it is looking for deviations outside of a window in the rain-sense line (the output of a bandpass filter). The magnitude of deviation that is required before the software acknowledges this as a rain-event is a variable which is synchronized to the motion of the wipers.

The software also functions as a smoothing algorithm. That is, the wipers do not simply actuate upon each rain-event. Rather, program changes the speed of the wiper or the interval between wipes smoothingly, which is much less distracting to the driver. The form of the smoothing algorithm is essentially a software realization of the McCumber et al. U.S. Pat. No. 4,620,141, with considerable enhancement.

The program is broken up into a "foreground routine" which executes on a regular sample basis, and a "background routine" that executes asynchronously. The foreground is responsible for maintaining an estimate of rain intensity, and the background of actuating the wiper motor accordingly.

PROGRAM VARIABLES

RAIN SENSE: The signal from the bandpass filter of the rain-sensing channel that is disturbed by drops of water impinging upon the sensor. In A/D units.

LIGHT SENSE: The signal from the bandpass filter of the light sensing section of the control that is disturbed by ambient light disturbances.

Both of these signals sit at some nominal reference voltage and deviate only if they sense rain or light, respectively.

QUIS RAIN: The quiescent value of RAIN SENSE. That is, it is the value of RAIN SENSE in the absence of nay moisture hitting the windshield, A/D units.

QUIS LIGHT: The quiescent value of LIGHT SENSE.

RAIN: A value between zero and 1—our estimate of the rain intensity.

SENS WIND: The sensitivity window reflects the number of counts of the A/D converter is permitted to deviate from the unexcited state before a signal is considered an event. It applies to both the RAIN SENSE and the LIGHT SENSE signals which derive from the bandpass filter, and an analogous to the width of a voltage window for a window comparator. For example, if the sensitive window is 5, then when the absolute value (RAIN SENSE−QUIS RAIN) is 6 or greater it is considered to be a rain event.

Kaa: The asymptotic attack coefficient constant.

Kld: The linear decay constant.

Kad: The asymptotic decay coefficient constant. All of the attack and decay constants are intended to change RAIN by only a small amount each foreground sample, and thus are much less than one.

OFF TIME: A value computed from RAIN indicating the desired dwell time between wipes.

Koff: The proportional constant for off time, in seconds per unit.

THE FOREGROUND ROUTINE

Figure 10:
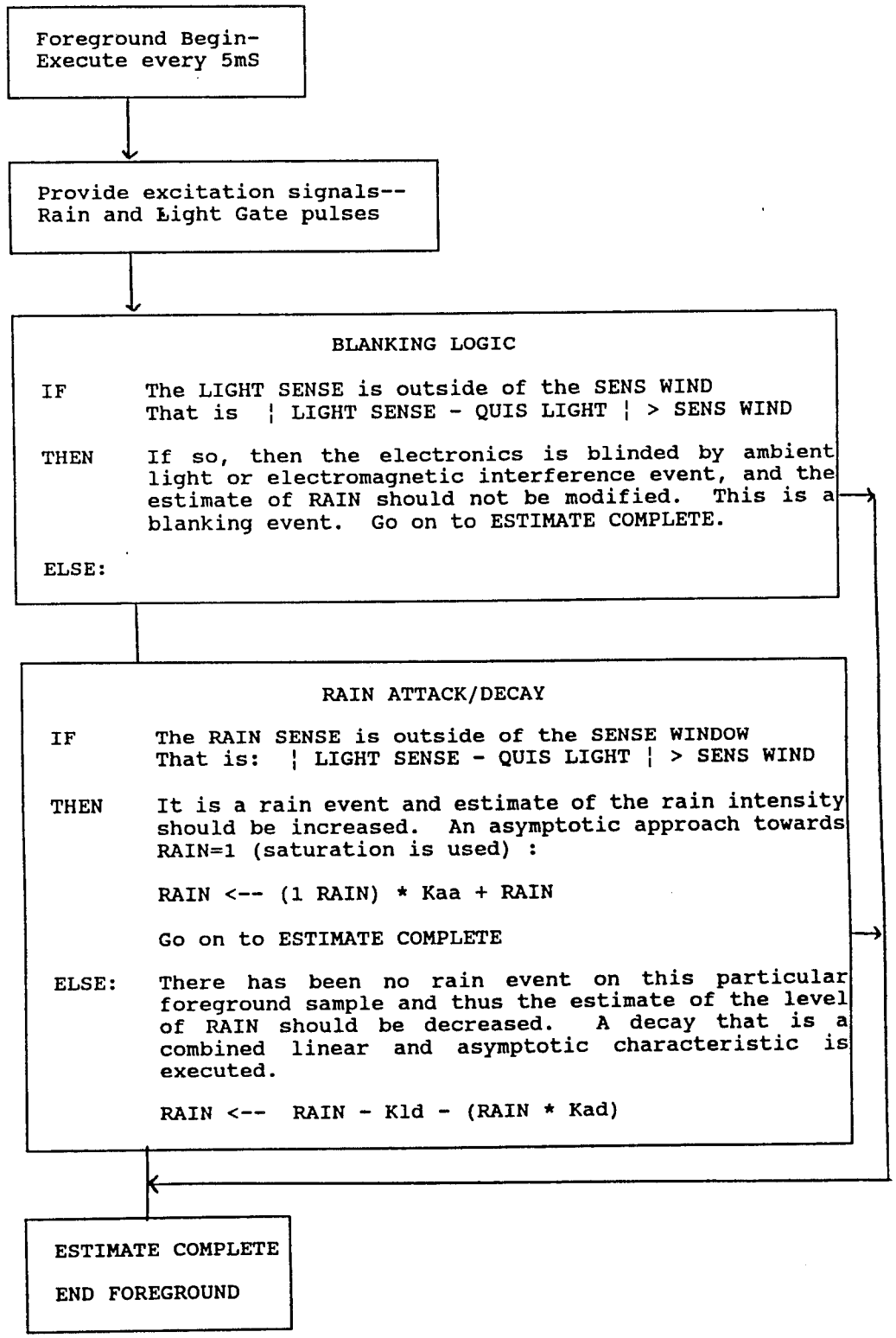
FIG. 10 is a software flow diagram of the foreground routine.

The foreground routine is shown in FIG. 10 and executes every 5 ms, essentially independently of the background, and is responsible for maintaining the on-going estimate of the rain intensity, RAIN.

The attack is asymptotic, or proportional to "distance to go" for every sample. The decay characteristic is linear plus some asymptotic coefficient. These characteristics are desirable for the purposes of making our RAIN estimate because, given a constant duty cycle (i.e., ratio of rain events to and absence of rain events), it will yield a stable value for RAIN.

Two factors are omitted in the above software description for ease of understanding:

1) The blanking events are monostable extended. Thus, if the software detects a blanking event, the unit will remain blanked for about two seconds.

2) The RAIN SENSE signal is actually delayed by a shift-register implemented in software, so it is actually the RAIN SENSE of several tens of milliseconds before.

The effects of these two factors is to allow a blanking event to blank out rain events that actually happen slightly before the actual blanking event. Thus, the blanking events blanks all rain events that are close in time to the disturbance.

THE BACKGROUND ROUTINE

Figure 11:
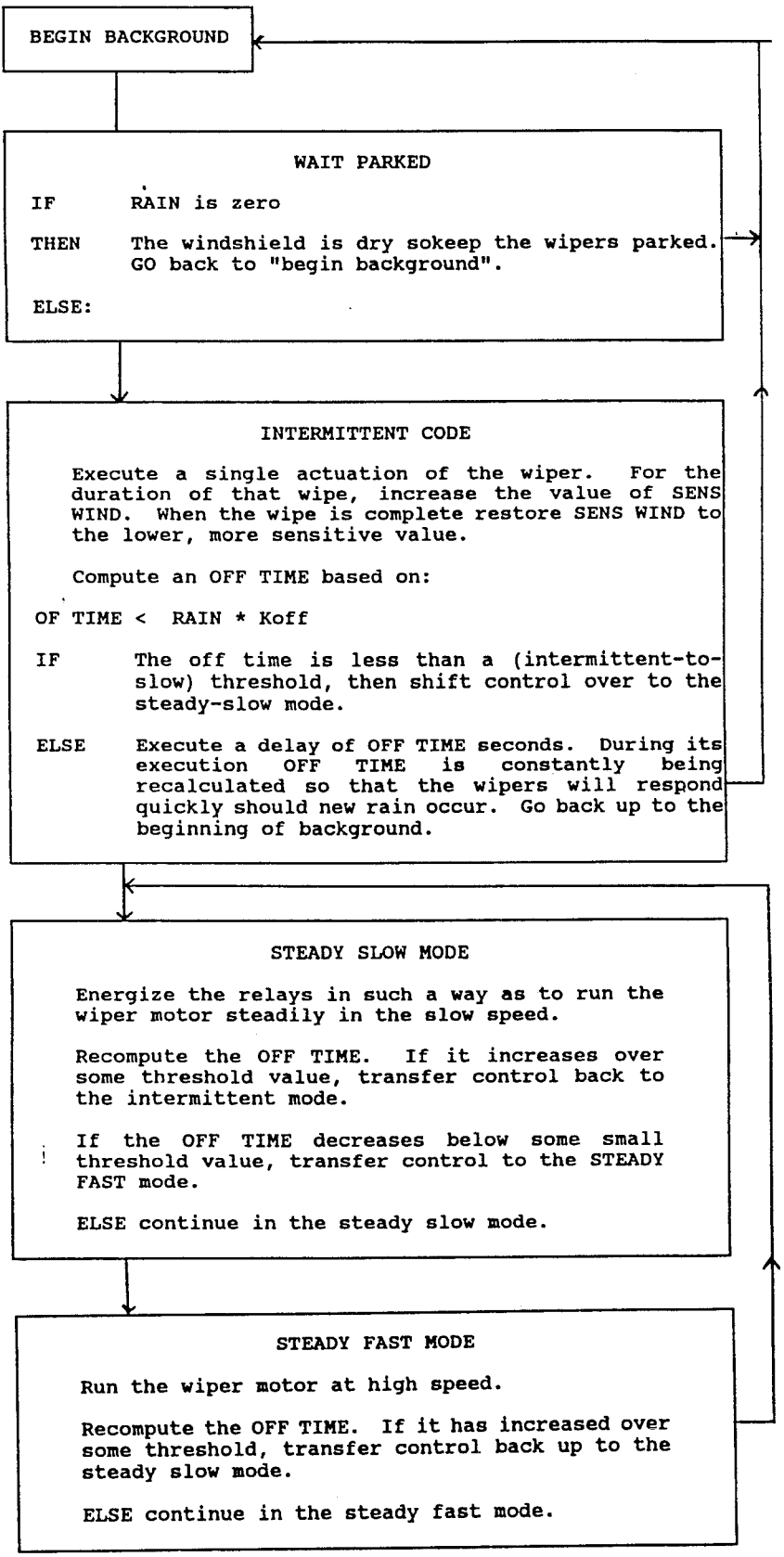
FIG. 11 is a software flow diagram of the background routine.

Referring to FIG. 11, the background program or routine is being constantly interrupted by the foreground routine, and it is responsible for causing proper actuation of the wiper motor. It gets information about the rain intensity from the foreground program in RAIN. Additionally, the background program modifies the value of the sensitivity window (SENS WIND) in synchronization to the actuation of the wiper. This is so that the intentional retrigger results in multiplication of effective sensor area.

Overall, the background program actuates the wipers at a rate which is approximately proportional to the value of the rain intensity, RAIN.

Not shown in the flow chart of FIG. 11 is the feature that should the user request a manual override, such as speed, off, or wash, the unit will actuate the relays in an appropriate fashion to bring about that request.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a vehicle of the type incorporating a windshield and at least one motor for operating a device on said vehicle, a control circuit for said motor for automatically activating same upon detection of moisture droplets on the exterior surface of said windshield, comprising:
    (a) a housing secured to the inside surface of said windshield, said housing having means for mounting an array of radiant energy sources and an array of radiant energy sensors such that radiant energy emitted by said sources are directed to the plane of the exterior surface of said windshield and normally are directed back to said array of sensors when no moisture droplets are present on the portion of said windshield occupied by said housing;
    (b) driver means for periodically energizing said radiant energy sources with pulses of a predetermined duty cycle, the interval when said radiant energy sources are "on" defining a rain sense interval and the interval when said radiant energy sources are "off" defining an ambient light sense interval;
    (c) first means for sampling and holding the output of said radiant energy sensors during said rain-sense interval;
    (d) second means for sampling and holding the output of said radiant energy sensors during said ambient light sense interval, the sampling by said first and second means occurring successively within a time interval which is significantly less than the time required for changes in ambient light impinging on said windshield;
    (e) means for linearly rejecting signal components in said sensor output due to ambient light disturbances in successive samples taken by said first and second means to leave only a signal component due to sensing of moisture droplets on said windshield; and
    (f) activating means responsive to said signal component due to sensing of moisture droplets for activating said motor.

2. The vehicle as in claim 1 wherein said device is a windshield wiper.

3. The vehicle as in claim 1 wherein said device is a window.

4. The vehicle as in claim 1 wherein said device is a retractable roof member.

5. The vehicle as in claim 2 wherein said activating means comprises a rain-controlled oscillator means coupled to receive said signal component due to sensing of moisture droplets on said windshield for driving said motor at a rate proportional to the rate at which said signal component due to sensing of moisture droplets is produced on successive cycles.

6. The vehicle as in claim 1 wherein said first and second means for sampling and holding and said means for linearly rejecting comprises a time-shifted, linear differential amplifier.

7. The vehicle as in claim 5 wherein said rain-controlled oscillator means is a programmed microprocessor.

8. A control circuit comprising in combination:
    (a) an optical sensor means for detecting the accumulation of moisture droplets on a transparent surface and producing a composite electrical signal having a component due to the presence of moisture and a component due to changes in ambient light reaching said sensor means, and producing an output signal having a component due to changes in ambient light;
    (b) means for sampling said composite electrical signal in a first interval when both components are present;
    (c) means for sampling the output signal from said optical sensor in a second interval when only said component due to changes in ambient light is present, said first and second intervals being taken close to one another in time;
    (d) differential amplifier means for forming a linear differential summation of said signals obtained during said first and second intervals; and
    (e) means for determining whether the output of said differential amplifier means exceeds a predetermined threshold.

9. In a motor vehicle of the type incorporating a windshield and a motor-driven windshield wiper, an improved windshield wiper motor controller for automatically activating the motor of said motor-driven windshield wiper upon detection of moisture droplets on the exterior surface of said windshield, comprising:
    (a) an opaque housing secured to the inside surface of said windshield, said housing having a first and a second plurality of bores whose longitudinal axes intersect at points at the exterior surface of said windshield and at an acute angle to the plane of the windshield, said first plurality of bores including individual radiant energy sources and said second plurality of bores including individual radiant energy sensors, individual ones of said sources being associated with individual ones of said sensors;

(b) driver means for periodically energizing said radiant energy sources with pulses of a predetermined duty cycle, the interval when said radiant energy sources are "on" defining a rain-sense interval and the interval when said radiant energy sources are "off" defining an ambient light sense interval;

(c) first means for sampling and holding the voltage output of said radiant energy sensors during said rain-sense interval;

(d) second means for sampling and holding the voltage output of said radiant energy sensors during said light-sense interval;

(e) differential summing means coupled to receive the outputs from said first and second means for sampling and holding, said differential summing means providing an output voltage, $V_{diff}$, proportional to the difference between said voltage outputs sampled and held by said first and second means;

(f) first window comparator means coupled to receive said voltage, $V_{diff}$, for signaling when the amplitude of said $V_{diff}$ voltage falls outside of a predetermined range of amplitudes; and (g) rain-control oscillator means coupled to receive the signal output from said first window comparator means for driving said windshield wiper motor at a rate proportional to the frequency with which said $V_{diff}$ voltage falls outside of said range of amplitudes during successive rain-sense intervals.

10. The motor controller as in claim 9 and further including an intensity-sensing and feedback circuit coupled to said radiant energy sources for adjusting the intensity of the radiant energy emitted by said radiant energy sources in accordance with the transmissivity of the windshield glass on which said housing is secured.

11. The motor controller as in claim 10 wherein said rain-controlled oscillator means comprises a microcontroller responsive to the rate of receipt of said signal outputs from said first window comparator means for generating windshield wiper control signals related to said rate of receipt.

12. The motor controller as in claim 11 wherein said microcontroller controls said driver means.

13. The motor controller as in claim 11 wherein said microcontroller controls said first and second means for sampling and holding.

14. The motor controller as in claim 11 and further including:

(a) third means for sampling and holding a sensor voltage level at a time during said ambient light sense interval to detect shifts in said sensor voltage level due to transient ambient light changes on said plurality of sensors;

(b) second window comparator means for determining whether said shifts in said sensor voltage level exceed upper or lower bounds and producing a binary signal indicative of the out-of-bounds condition; and (c) means for applying said binary signal to said microcontroller for inhibiting said signal outputs from said first window comparator means from changing the rate at which said windshield wiper motor is driven during a predetermined time interval following the production of said binary signal by said second window comparator means.

15. The motor controller as in claim 11 and further including:

(a) third means for sampling and holding a sensor voltage level at a time during said ambient light sense interval to detect shifts in said sensor voltage level due to transient electromagnetic interference on said plurality of sensors;

(b) second window comparator means for determining whether said shifts in said sensor voltage level exceed upper or lower bounds and producing a binary signal indicative of the out-of-bounds condition; and (c) means for applying said binary signal to said microcontroller for inhibiting said signal outputs from said first window comparator means from changing the rate at which said windshield wiper motor is driven during a predetermined time interval following the production of said binary signal by said second window comparator means.

* * * * *